(12) United States Patent
Murata

(10) Patent No.: US 9,489,975 B2
(45) Date of Patent: Nov. 8, 2016

(54) OPTICAL DISK DEVICE AND OPTICAL DISK PROCESSING SYSTEM HAVING OPTICAL DISK DEVICE

(75) Inventor: Tatsuya Murata, Tokorozawa (JP)

(73) Assignee: Almedio Inc., Tokyo (JP)

( * ) Notice: Subject to any disclaimer, the term of this patent is extended or adjusted under 35 U.S.C. 154(b) by 125 days.

(21) Appl. No.: 12/534,074

(22) Filed: Jul. 31, 2009

(65) Prior Publication Data

US 2010/0027395 A1   Feb. 4, 2010

(30) Foreign Application Priority Data

Aug. 4, 2008  (JP) ................. 2008-200488

(51) Int. Cl.
| | | |
|---|---|---|
| G11B 19/10 | (2006.01) | |
| G11B 7/26 | (2006.01) | |
| G11B 19/12 | (2006.01) | |
| G11B 7/0037 | (2006.01) | |
| G11B 7/00 | (2006.01) | |

(52) U.S. Cl.
CPC ............ *G11B 7/265* (2013.01); *G11B 7/268* (2013.01); *G11B 19/10* (2013.01); *G11B 19/12* (2013.01); *G11B 7/0037* (2013.01); *G11B 2007/0016* (2013.01)

(58) Field of Classification Search
USPC ...................................... 369/53.41
See application file for complete search history.

(56) References Cited

U.S. PATENT DOCUMENTS

| | | | | |
|---|---|---|---|---|
| 5,115,419 A | * | 5/1992 | Akiyama et al. | 369/30.95 |
| 5,150,349 A | * | 9/1992 | Takai et al. | 720/626 |
| 5,418,766 A | * | 5/1995 | Fujisawa et al. | 369/53.23 |
| 5,854,719 A | * | 12/1998 | Ginosar et al. | 360/69 |
| 6,111,832 A | | 8/2000 | Tsuchiya et al. | |
| 6,301,210 B1 | * | 10/2001 | Yamazaki | G11B 7/0045 369/47.25 |
| 7,264,323 B2 | * | 9/2007 | Tainer et al. | 347/11 |
| 7,277,372 B2 | * | 10/2007 | Watanabe et al. | 369/53.2 |
| 2001/0024272 A1 | | 9/2001 | Luetjens | |
| 2005/0201808 A1 | * | 9/2005 | Barry et al. | 400/679 |

FOREIGN PATENT DOCUMENTS

| | | | |
|---|---|---|---|
| DE | 10004889 A1 | 8/2001 | |
| DE | 69727161 T2 | 9/2004 | |
| JP | 7176121 A | 7/1995 | |
| JP | 11213530 | * 8/1999 | ............ G11B 19/12 |
| JP | 11-345453 A | 12/1999 | |
| JP | 2003248995 A | 9/2003 | |
| JP | 2004127367 A | 4/2004 | |
| JP | 3797318 B2 | 7/2006 | |
| JP | 2008084447 A | 4/2008 | |

OTHER PUBLICATIONS

MAT (machine assisted translation) of JP 11-213530 (abstract, detail description).*

(Continued)

*Primary Examiner* — Brian Butcher
(74) *Attorney, Agent, or Firm* — Seed IP Law Group LLP

(57) ABSTRACT

An optical disk device which quickly detects that a transparent disk is loaded is provided. When an optical disk is loaded, a drive controller of an optical disk device drives a spindle motor and checks existence of an optical disk based on a driving result. In addition, the drive controller drives an optical pickup to apply a focus control, to detect whether or not focusing is possible. When it is determined from the driving result that there is an optical disk and that focus is not possible, the drive controller judges that the optical disk (D) is a transparent disk.

6 Claims, 4 Drawing Sheets

| FOCUS SEARCH METHOD | DISK INERTIA METHOD | JUDGMENT RESULT |
|---|---|---|
| NO DISK | NO DISK | NO DISK |
| DISK EXISTING | NO DISK | CHUCKING MALFUNCTION |
| NO DISK | DISK EXISTING | TRANSPARENT DISK |
| DISK EXISTING | DISK EXISTING | DISK EXISTING |

(56) References Cited

OTHER PUBLICATIONS

MAT (Machine assisted translatinoo) of JP 11-345453—detail description.*
MAT (Machine assisted translation) of JP 2004-164796—detail description—claims.*

German Office Action issued in corresponding German Application No. 10 2009 026 317.9, dated May 3, 2012, 10 pages.

Japanese Office Action issued in corresponding JP Application No. 2008-200488, dated Nov. 29, 2011, 4 pages.

* cited by examiner

| FOCUS SEARCH METHOD | DISK INERTIA METHOD | JUDGMENT RESULT |
|---|---|---|
| NO DISK | NO DISK | NO DISK |
| DISK EXISTING | NO DISK | CHUCKING MALFUNCTION |
| NO DISK | DISK EXISTING | TRANSPARENT DISK |
| DISK EXISTING | DISK EXISTING | DISK EXISTING |

FIG. 3

OPTICAL DISK DEVICE AND OPTICAL DISK PROCESSING SYSTEM HAVING OPTICAL DISK DEVICE

PRIORITY INFORMATION

This application claims priority to Japanese Patent Application No. 2008-200488, filed on Aug. 4, 2008, which is incorporated herein by reference in its entirety.

BACKGROUND

1. Technical Field

The present invention relates to an optical disk device and an optical disk processing system having the optical disk device, and in particular to detection of a transparent disk.

2. Related Art

When a CD or a DVD is mass-produced, the manufacturing cost is reduced using a large-scale device having a disk changer. On the other hand, an optical disk processing system is proposed in which a recording unit which writes information on the optical disk, a printing unit which prints on a label surface of the optical disk, and a disk changer are integrated, in order to handle cases of custom-made optical disks which do not require mass production such as, for example, school learning materials, commemorative items, presents, etc. In this optical disk processing system, a sequence of processes are automatically executed in which an optical disk which is not yet processed is transported from a stocker to a recording unit and loaded, data is recorded by the recording unit, the recorded optical disk is ejected, the recorded optical disk is transported to the printing unit and a print is applied on the label surface, and the printed optical disk is again transported back to the stacker. JP 3797318 B discloses an optical disk processing system in which a recording unit, a printing unit, and a disk changer are integrated.

There may be cases where a protection transparent disk having approximately the same shape as the optical disk, and which protects the optical disk, may be equipped in the stocker, and the optical disk processing system may take out the protection transparent disk and transport to the recording unit. When the protection transparent disk is transported, the optical disk device which is the recording unit stores the transported protection transparent disk and irradiates laser light from an optical pickup, to attempt to focus. However, because the disk is a transparent disk, there is no return light, and the controller of the optical disk device would erroneously judge that there is no disk. JP11-345453A discloses a configuration where a photosensor is provided sandwiching the disk, and scattered light from the optical disk is detected, to detect the state of no disk, or three states indicating disk existing (normal disk, disk present, semitransparent disk).

However, in the above-described related art, because scattered light created at a reflection surface of the optical disk is used, it is not possible to judge the protection transparent disk through which the laser light completely transmits, and which causes no scattered light.

There is also known a method for judging the existence/non-existence of a disk by driving a spindle motor and measuring a load (inertia) applied on the spindle motor based on the startup time and number of rotations. With this method, it is possible to detect that there is a disk, even for the protection transparent disk. However, when the device attempts to focus, because there is no return light, retrying of the focus would be repeatedly executed multiple times, and there is a problem that a certain amount of time is required until an error is finally judged.

SUMMARY

The present invention advantageously provides a device and a system which can quickly detect that a loaded disk is a transparent disk, when a transparent disk such as a protection transparent disk is loaded.

According to one aspect of the present invention, there is provided an optical disk device comprising a driving unit which rotationally drives an optical disk, a detecting unit which detects reflected light of laser light which is irradiated on the optical disk, and a judging unit which judges that the optical disk is a transparent disk based on a driving result by the driving unit and a detection result by the detecting unit.

According to another aspect of the present invention, it is preferable that, in the optical disk device, the detecting unit is a focus control unit.

According to another aspect of the present invention, it is preferable that, in the optical disk device, the judging unit further judges that the optical disk has a chucking malfunction based on the driving result by the driving unit and the detection result by the detecting unit.

According to another aspect of the present invention, it is preferable that, in the optical disk device, the judging unit judges that the optical disk is the transparent disk when the driving result by the driving unit indicates existence of an optical disk and the detection result by the detecting unit indicates non-existence of an optical disk.

According to another aspect of the present invention, it is preferable that, in the optical disk device, the judging unit judges that the optical disk is has chucking malfunction when the driving result by the driving unit indicates non-existence of an optical disk and the detection result by the detecting unit indicates existence of an optical disk.

According to another aspect of the present invention, there is provided an optical disk processing system comprising the above-described optical disk and a printing unit which prints on a label surface of the optical disk, wherein the system consecutively processes data recording at the optical disk device and label surface printing at the printing unit.

According to various aspects of the present invention, when a transparent disk is loaded, it is possible to quickly judge that the loaded disk is a transparent disk.

BRIEF DESCRIPTION OF THE DRAWINGS

FIG. 3 is a diagram for explaining a judgment result in a preferred embodiment of the present invention.

DETAILED DESCRIPTION

A preferred embodiment of the present invention will now be described with reference to the drawings.

Figure 1:
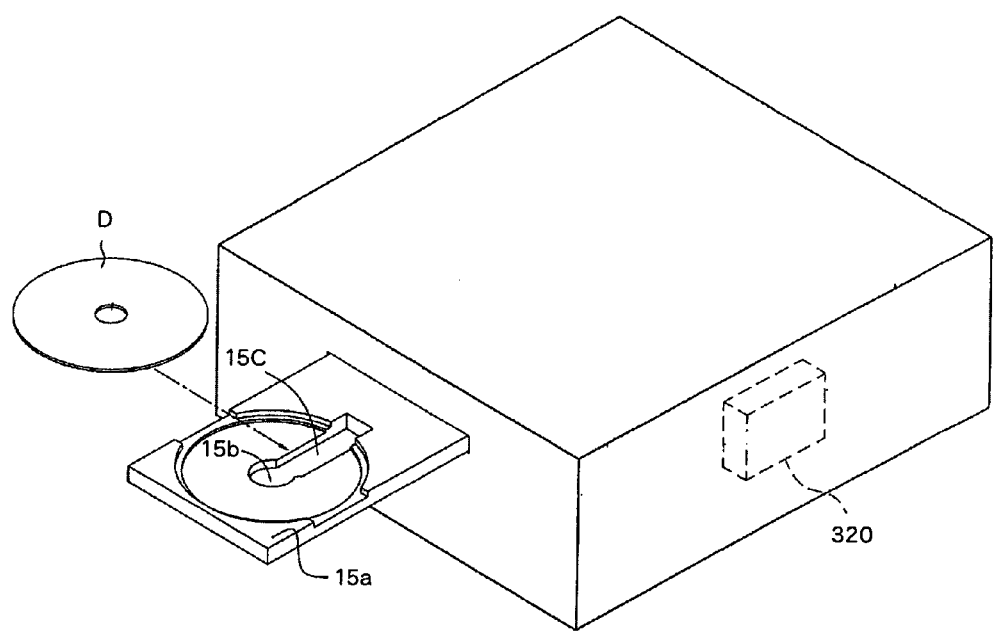
FIG. 1 is an overview of an optical disk device.

FIG. 1 shows an overview of an optical disk device according to a preferred embodiment of the present invention. A disk tray 15a, an optical pickup, a spindle motor, a turntable, and a circuit board are assembled in a case of an optical disk device. On a front surface of the case, an open/close switch of the disk tray 15a or the like is provided.

Various switches such as the open/close switch are connected to a drive controller 320 which executes a primary control of the optical disk device.

The disk tray 15*a* is provided to be movable between a storage position (loading position) where an optical disk D such as a CD or a DVD is stored (loaded) in the case when the optical disk D is recorded or replayed and an exposed position (eject position) where the optical disk D is exposed to the outside of the case. A recess corresponding to an outer size of the optical disk D is formed in the disk tray 15*a*. At a center portion of the disk tray 15*a*, a through hole 15*b* through which the spindle motor and the turntable are inserted when the optical disk D is loaded is formed, and an access opening 15*c* for allowing the optical pickup to access the optical disk D is formed connecting to the through hole 15*b*.

Figure 2:
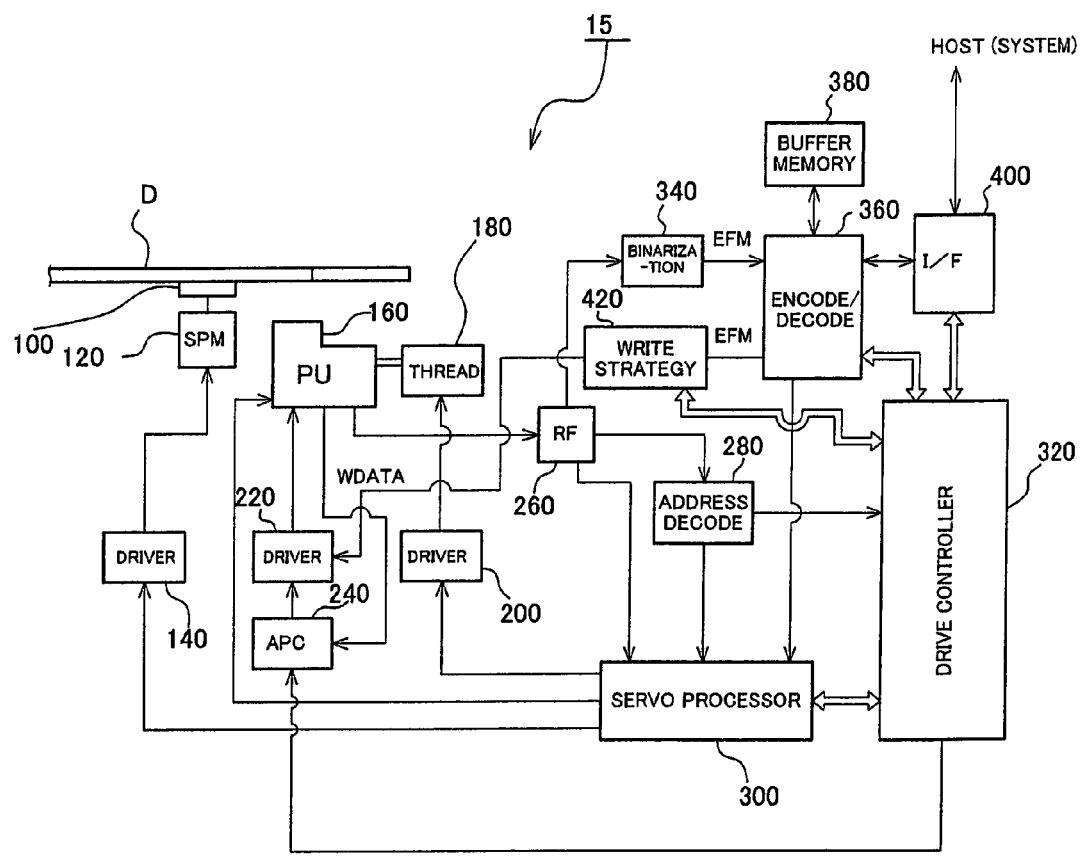
FIG. 2 is a structural block diagram of an optical disk device.

FIG. 2 is a block diagram which shows an internal structure of the optical disk device. The optical disk D which is loaded by the disk tray 15*a* is clamped by a magnetic clamper (not shown), is placed on a turntable 100, and is rotationally driven by a spindle motor (SPM) 120 along with the turntable 100. The spindle motor SPM 120 is driven by a driver 140, which is servo-controlled by a servo processor 300 so that the spindle motor SPM 120 has a desired rotation speed.

An optical pickup 160 comprises a laser diode (LD) for irradiating laser light on the optical disk D and a photodetector (PD) which receives reflected light from the optical disk D and converts into an electric signal, and is placed opposing the optical disk D. The optical pickup 160 is driven in a radial direction of the optical disk D by a thread motor 180 which is driven by a driver 200. The driver 200 is servo-controlled by the servo processor 300 similar to the driver 140. In addition, the LD of the optical pickup 160 is driven by a driver 220, and, in the driver 220, a drive current is controlled by an automatic power control circuit (APC) 240 so that the laser power is at a desired value. The APC 240 and the driver 220 control the amount of light emission of the LD by an instruction from a system controller 320. In FIG. 2, the driver 220 is provided separately from the optical pickup 160, but the driver 220 may alternatively be equipped in the optical pickup 160.

When data is recorded on the optical disk D, data to be recorded which is supplied from the system which is the host is supplied through an interface I/F 400 to an encode/decode circuit 360. The encode/decode circuit 360 stores the data to be recorded in a buffer memory 380, encodes the data to be recorded into modulated data, and supplies the modulated data to a write strategy circuit 420. The write strategy circuit 420 converts the modulated data into multi-pulse (a pulse train) according to a predetermined recording strategy, and supplies as recording data to the driver 220. Because the recording strategy affects the recording quality, normally, the recording strategy is fixed to a certain optimum strategy. The laser light having the power modulated by the recording data is irradiated from the LD of the optical pickup 160 and data is recorded on the optical disk D. After the data is recorded, the optical pickup 160 irradiates laser light of replay power to replay the recording data and supplies to an RF circuit 260. The RF circuit 260 supplies the replay signal to a binarization circuit 340, and binarized data is supplied to the encode/decode circuit 360. The encode/decode circuit 360 decodes the modulated data, and matches with the recording data stored in the buffer memory 380. The result of the matching is supplied to the drive controller 320. The drive controller 320 determines whether the data continues to be recorded or an exchange process is to be executed based on the result of the matching.

In such a structure, the drive controller 320 uses both a focus search method and a disk inertia measuring method, to quickly detect whether or not the optical disk D is a protection transparent disk. Here, the focus search method is a method where replaying laser light is irradiated from the optical pickup 160 for focus search, and it is judged that there is a disk when an amount of return light or a focus s-curve can be detected. The disk inertia method is a method where the spindle motor 120 is driven and the load (inertia) applied on the spindle motor 120 is measured based on the startup time and the rotational speed, to judge the existence/non-existence of the disk.

More specifically, the transparent disk is judged in the following manner. Specifically, when the optical disk D is stored, the drive controller 320 drives the spindle motor 120 through the driver 140, to rotate the optical disk D. The rotational speed of the spindle motor 120 is measured after a predetermined time has elapsed from the startup, the load of the spindle motor 120 is detected based on the measured rotational speed, and the existence/non-existence of the disk is judged based on the size of the load. When the optical disk D exists, a load corresponding to the inertia of the optical disk D would be applied on the spindle motor 120, and thus the rotational speed after a predetermined time has elapsed from the startup would be lower than a predetermined threshold value. When, on the other hand, there is no optical disk D, because there is no load of the optical disk D on the spindle motor 120, the rotational speed after a predetermined time has elapsed from the startup would be greater than the predetermined threshold value. Therefore, it is possible to judge the existence/non-existence of the optical disk D by comparing the rotational speed with the predetermined threshold value. Alternatively, in place of measuring the rotational speed after a predetermined time has elapsed from the startup, it is also possible to measure a required time period from the startup to the time when a predetermined rotational speed is reached and to compare the of the measured time with a predetermined threshold value. It is possible to judge that the optical disk D does not exist when the required time period is lower than the threshold value and to judge that there is the optical disk D when the required time period is greater than the threshold value.

Next, when it is judged that the optical disk D exists, the drive controller 320 drives the optical pickup 160 through the servo processor 300, to execute focus control and focus. The method of focus control is well known. For example, in an astigmatism method, reflected light from the optical disk D is received by a four-way photodetector, and a focus error signal is generated by a differential output between light receiving surfaces. The position of the objective lens is adjusted using an actuator so that the focus error signal becomes zero. When the focus error signal is not generated even when the focus control is applied, the drive controller 320 judges that there is no return light, that is, the drive controller 320 judges that the optical disk D is a transparent disk. When, on the other hand, the focus control can be executed, the drive controller 320 judges that a normal optical disk D exists. When only the disk inertial method is employed, time would be required until it is finally judged that there is no disk after repeating retry of focus search as the light cannot be focused. In the present embodiment, on the other hand, because the existence/non-existence of the disk is first judged by the disk inertia method and then the focus search method is executed after it is judged that there is a disk, if the light cannot be focused, it can be immediately judged that the transparent disk exists, without the need for retry.

In the above description, the method transitions to the focus search method when it is judged by the disk inertial method that the optical disk D exists. Alternatively, it is also possible to transition to the focus search method even when it is judged by the disk inertial method that no optical disk D exists. When the light cannot be focused, the drive controller 320 judges that there is no optical disk D and, when the light can be focused, the drive controller 320 judges that there is the optical disk D, but the chucking of the optical disk D by the clamper is malfunctioning. In other words, the drive controller 320 judges that, because the optical disk D is not accurately chucked, an accurate load is not applied to the spindle motor 120.

FIG. 3 shows a judgment result in the present embodiment. When it is determined that there is no disk with the focus search method and that there is no disk with the disk inertial method, it is judged that no optical disk D exists. When it is determined that there is a disk with the focus search method and that there is no disk with the disk inertia method, it is judged that the chucking of the optical disk D is malfunctioning. When it is determined that there is no disk with the focus search method and that there is a disk with the disk inertia method, it is judged that the optical disk D is a transparent disk. When it is determined that there is a disk with the focus search method and that there is a disk with the disk inertia method, it is judged that a normal optical disk (non-transparent optical disk) exists. In this manner, in the present embodiment, it is possible to quickly judge whether or not the optical disk D is a transparent disk and whether or not there is a chucking malfunction.

Figure 4:
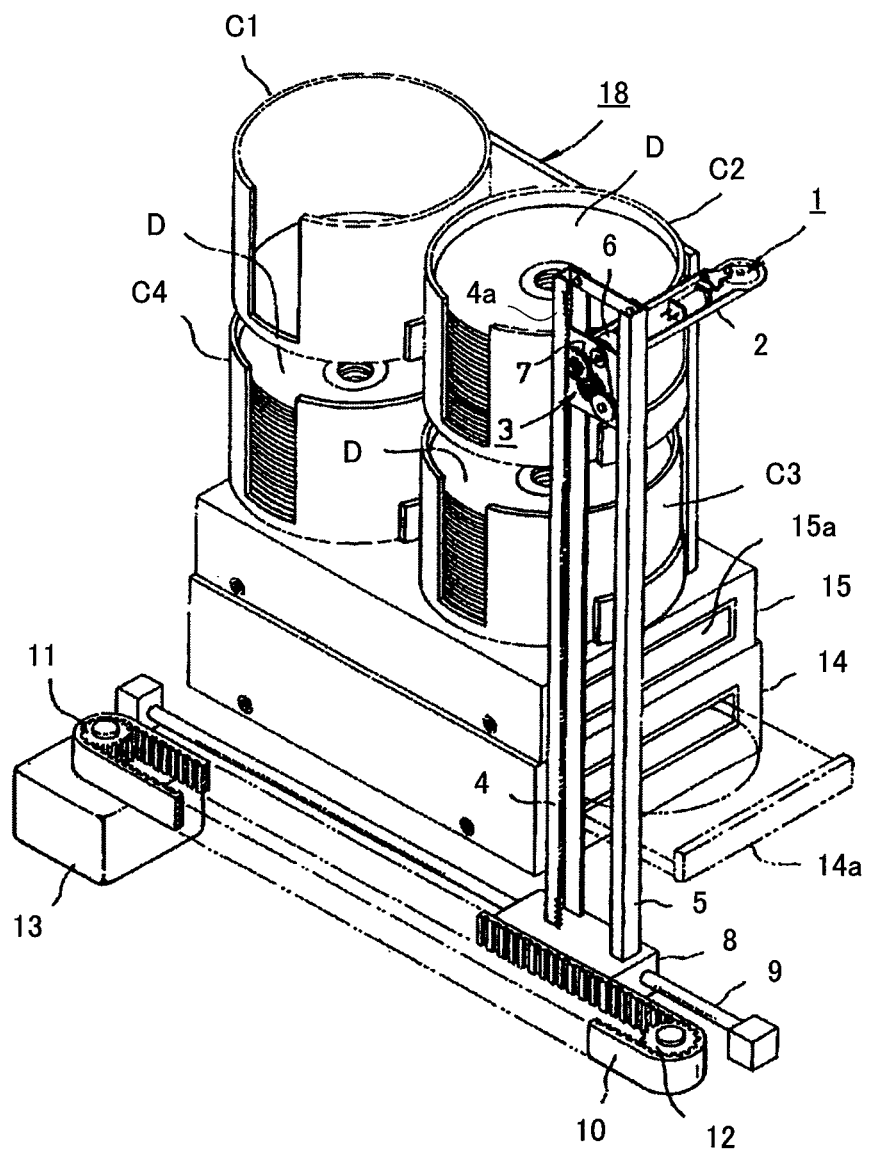
FIG. 4 is an overview of an optical disk processing system.

FIG. 4 shows an overview of an optical disk processing system having an optical disk device according to a preferred embodiment of the present invention. On an upper surface of a ceiling plate of a recording unit 15 which is an optical disk device, a plurality of cases C1, C2, C3, and C4 for storing an optical disks D and having a same volume are placed. These cases C1, C2, C3, and C4 are supported by a support structure 18 placed at the back of the cases, and are configured to be detachable from the support structure 18. In the placement state of the cases C1, C2, C3, and C4 shown in FIG. 4, the case C1 is set as a collection case and cases C2, C3, and C4 are set as stock cases, and a predetermined number of optical disks which are not yet processed are stored in the cases.

A clamp unit 1 is for clamping a center hole of the optical disk D, and is provided on a transport arm 2. One end of the transport arm 2 is fixed on an elevation mechanism 3. The elevation mechanism 3 is supported by support columns 4 and 5, a driving force of an output shaft of a motor 6 is transmitted to a gear 7 through a pulley, the elevation mechanism 3 is moved up and down along a vertical direction by engagement of the gear 7 with a rack gear 4a of the support column 4, and the transport arm 2 is moved up and down.

An end of the support columns 4 and 5 is fixed on a slider block 8 which is supported in a slidable manner on a guide shaft 9. The slider block 8 is also connected and fixed on a belt 10 which is provided in a stretched manner between wheels 11 and 12. With the belt 10 driven by a motor 13, the slider block 8, the support columns 4 and 5, and the transport arm 2 move back and forth in a horizontal direction.

A printing unit 14 prints on a label surface of the optical disk D loaded by a disk tray 14a. The recording unit 15 records information on an optical disk D which is loaded by a disk tray 15a.

In the transporting of the optical disk D among the cases, printing unit 14, and recording unit 15, the transporting of the optical disk D in the upward and downward directions is achieved by the elevation mechanism 3 and the transporting in the horizontal direction is achieved by driving the belt 10.

In the process of the optical disk D, a control program is configured so that the optical disks are processed for each of the cases C2, C3, and C4 which are stock cases, and a system processor which controls an operation of the overall system executes the control program. First, an optical disk D at an uppermost layer of the case C2 is clamped by the disk clamp unit 1, and is sequentially transported to the printing unit 14 and the recording unit 15 and subjected to predetermined processes. After the predetermined processes are completed, the processed optical disk D is stored in the case C1 which is the collection case. After the optical disks D of the case C2 are sequentially processed and the case C2 is emptied of the optical disk D, the control program at this point judges to set the case C2 as the collection case. As the process is continued, after the predetermined processes are applied to the optical disks D which are stored in the case C3 and which are not yet processed, the optical disks D are stored in the case C2 which is now set as a collection case. Then, similar processes are repeated.

In the above description, for the optical disk D, first the printing unit 14 prints on the label surface, and, then the recording unit 15 records the data. However, the present invention is not limited to such a configuration, and it is also possible to employ a configuration, for example, in which the optical disk D taken out from the case is first transported to the recording unit 15, data is recorded by the recording unit 15, and then the printing unit 14 prints on the label surface.

When the loaded optical disk D is the protection transparent disk, the drive controller 320 of the recording unit 15 supplies a detection signal indicating this to the system processor of the processing system. The system processor receives the detection signal from the drive controller 320, and transmits a particular command to the drive controller 320. The particular command is, for example, an eject command of the disk tray 15a. The transport arm 2 takes out the protection transparent disk from the ejected disk tray 15a, then takes out a new optical disk D from the stock case, and transports to the disk tray 15a of the recording unit 15. A similar process may be also executed in the case of chucking malfunction. Alternatively, when chucking malfunction is judged, the disk tray 15a may be temporarily ejected, the disk may be re-loaded, and the process may be retried.

In the present embodiment, the focus search method is employed. Alternatively, in place of the focus search method, a technique may be employed in which laser light is simply irradiated on the optical disk D and existence/non-existence of the reflected light is detected. That is, when it is determined that there is a disk with the disk inertia method and no reflected light is detected, it is judged that the optical disk D is a transparent disk. This similarly applies to chucking malfunction.

What is claimed is:

1. A method of determining an optical disk presence, type and condition, comprising:

(a-i) driving a spindle motor and detecting presence of a disk based on an amount of a load applied to the spindle motor, and executing focus control based on light reflected from the disk and concluding, based on focusing being possible, that the disk that is present is a first optical disk configured to record data;

(a-ii) driving the spindle motor and detecting presence of a disk based on an amount of a load applied to the spindle motor, and executing focus control based on light reflected from the disk and concluding, based on focusing not being possible, that the disk that is present is a transparent protective disk, which is different from the first optical disk configured to record data;

(b-i) driving the spindle motor and detecting absence of a disk based on an amount of a load applied to the spindle motor, and executing focus control based on light reflected from the disk and concluding, based on focusing being possible, that the first optical disk configured to record data is present, but is mischucked; and (b-ii) driving the spindle motor and detecting absence of a disk based on an amount of a load applied to the spindle motor, and executing focus control based on light reflected from the disk and concluding, based on focusing not being possible, that no disk is present.

2. The method of claim 1, further comprising:
recording data on the first optical disk.

3. The method of claim 2, further comprising:
printing indicia on the first optical disk on which data is recorded.

4. An optical disk device comprising:
a spindle motor configured to rotationally drive a disk;
a light detector configured to measure light reflected from a disk; and
a controller coupled to the spindle motor and the light detector, wherein the controller, in operation, (a-i) drives the spindle motor and detects presence of a disk based on an amount of a load applied to the spindle motor, and executes focus control based on light reflected from the disk and concludes, based on focusing being possible, that the disk that is present is a first optical disk configured to record data;

(a-ii) drives the spindle motor and detects presence of a disk based on an amount of a load applied to the spindle motor, and executes focus control based on light reflected from the disk and concludes, based on focusing not being possible, that the disk that is present is a transparent protective disk, which is different from the first optical disk configured to record data;

(b-i) drives the spindle motor and detects absence of a disk based on an amount of a load applied to the spindle motor, and executes focus control based on light reflected from the disk and concludes, based on focusing being possible, that the first optical disk configured to record data is present, but is mischucked; and (b-ii) drives the spindle motor and detects absence of a disk based on an amount of a load applied to the spindle motor, and executes focus control based on light reflected from the disk and concludes, based on focusing not being possible, that no disk is present.

5. The optical disk device of claim 4, wherein the controller, in operation, records data on the first optical disk.

6. The optical disk device of claim 5, further comprising:
a printer configured to print indicia on the first optical disk on which data is recorded.

* * * * *